United States Patent
Samad et al.

(10) Patent No.: US 10,628,075 B1
(45) Date of Patent: Apr. 21, 2020

(54) DATA PROTECTION COMPLIANCE BETWEEN STORAGE AND BACKUP POLICIES OF VIRTUAL MACHINES

(71) Applicant: EMC Corporation, Hopkinton, MA (US)

(72) Inventors: Mohammed Abdul Samad, Bangalore (IN); Shelesh Chopra, Bangalore (IN); Vladimir Mandic, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 212 days.

(21) Appl. No.: 15/193,330

(22) Filed: Jun. 27, 2016

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0664* (2013.01); *G06F 3/0683* (2013.01)

(58) Field of Classification Search
CPC ...... G06F 3/065; G06F 3/0619; G06F 3/0664; G06F 3/0683
See application file for complete search history.

(56) References Cited

U.S. PATENT DOCUMENTS

| | | | | |
|---|---|---|---|---|
| 2003/0208589 A1* | 11/2003 | Yamamoto | .......... | H04L 41/0853 709/224 |
| 2007/0162454 A1* | 7/2007 | D' Albora | .............. | G06Q 10/10 |
| 2008/0235755 A1* | 9/2008 | Blaisdell | ............. | H04L 63/0227 726/1 |
| 2012/0323853 A1* | 12/2012 | Fries | ..................... | G06F 11/301 707/649 |
| 2016/0378518 A1* | 12/2016 | Antony | ............... | G06F 9/45533 718/1 |
| 2017/0060705 A1* | 3/2017 | Sridhara | ............. | G06F 11/1662 |

OTHER PUBLICATIONS

Nelson Aguilar, The Ultimate Guide to Deleting, Merging, & Hiding Contacts on Your iPhone, https://ios.gadgethacks.com/how-to/ultimate-guide-deleting-merging-hiding-contacts-your-iphone-0161541/ (Year: 2015).*

* cited by examiner

*Primary Examiner* — Kalpit Parikh
(74) *Attorney, Agent, or Firm* — Dergosits & Noah LLP; Todd A. Noah

(57) ABSTRACT

Data protection compliance between virtual machines' storage policies and backup policies is described. A compliance tool identifies a storage policy associated with a virtual machine storage management tool and a virtual machine. The compliance tool identifies a backup policy associated with the virtual machine. If the compliance tool determines that the backup policy has a data protection capability that is missing from the storage policy, the compliance tool outputs a report which indicates that the backup policy has the data protection capability that is missing from the storage policy.

20 Claims, 4 Drawing Sheets

202

| Storage Policy Identifier 204 | Storage Policy Name 206 | Storage Capability 208 | Capability Mapping 210 | Client Name(s) 212 |
|---|---|---|---|---|
| 8e107784-2847-454b-9147 | Gold | Hourly Snapshots 1 Day Retention | Hourly Backup 1 Day Retention | VM_001 |
| 7f540da49-1728-e107-7842 | Silver | Daily Snapshots 2 Week Retention | Daily Backup 2 Week Retention | |
| 45780eb47-8263-01a4-7212 | Bronze | Weekly Snapshots 4 Week Retention | Weekly Backup 4 Week Retention | VM_002, VM_003 |

214

| Client Identifier 216 | Client Name 218 | Backup Policy Identifier 220 | Backup Capability 222 |
|---|---|---|---|
| 4f510da49-1728-e107-5142 | VM_001 | ad465066-3815-4ed7 | Daily Backup 1 Week Retention |
| 7a387121-7285-1e75-1422 | VM_002 | e1f231161-ea6e-ad46 | Weekly Backup 4 Week Retention |
| 8e127785-2847-454e-5147 | VM_003 | 4ed785881-5066-3815 | Daily Backup 2 Week Retention |

FIG. 2

DATA PROTECTION COMPLIANCE BETWEEN STORAGE AND BACKUP POLICIES OF VIRTUAL MACHINES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. A backup/restore application may create a full backup file that includes all of a data object or the parts of the data object that are used. A backup/restore application may also create an incremental backup file that includes only changes made to the data object since a selected time, such as a previous backup of the data object.

An image, such as a snapshot, is a capture of a state of a data object, such as a file system, a virtual machine, or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create images of data objects and store the images of data objects on multiple storage arrays.

A virtual machine is a software implementation of a computer that executes programs like a physical machine. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, known as hardware virtualization, the key to a cloud computing environment. Similar to other data objects, backup copies may be made of virtual machine data objects to enable a restoration of the virtual machine data objects in the event of corruption or an erroneous update to the virtual machine data objects.

Server virtualization has proven to be a highly effective technology in many enterprises, and is a key element enabling cloud and information technology as a service offerings. Storage technology has been an area of increased focus as server virtualization has expanded, due to the impact server virtualization has on data access patterns of applications. Some enterprises have consolidated information technology roles and responsibilities, as utilizing information technology generalists, such as hypervisor-centric information technology administrators, may be more efficient. Virtual machine management tools are expanding to encompass more of the information technology infrastructure to improve the efficiency and effectiveness of information technology generalists.

An example of a virtual machine management tool is VASA (vSphere APIs for Storage Awareness), which is a virtual machine storage management tool that is available from VMware® and that enables Virtual Volumes (VVOLs), which is an integration and management framework for external storage such as storage area networks (SAN) and network-attached storage (NAS). This Virtual Volumes framework allows customers to easily assign and manage storage capabilities on a per-virtual machine basis at the hypervisor level using storage policy-based management. The Virtual Volumes storage architecture represents a significant change in the way hypervisors utilize and interact with storage systems. The VASA virtual machine storage management tool utilizes the unique capabilities of each underlying storage system, as presented through the VASA interface. This VASA interface enables virtual machine administrators and non-storage information technology administrators to have visibility into storage system quality of service features, such as RAID levels and drive type, and to leverage the storage systems data protection features including snapshots. With direct virtual machine to storage device mapping, the Virtual Volumes framework provide fine grain controls for data protection and I/O performance analysis. The storage and data services can be applied on a per virtual machine disk level as opposed to a data store level. The data services provided by storage vendors can be easily leveraged now rather than leveraging the services developed and maintained by virtual machine management tools.

Storage policy-based management enables the capturing of storage service levels requirements such as capacity, performance, availability, and data protection, in the form of logical templates, or policies, to which virtual machines are associated. Storage policy-based management automates storage provisioning by identifying available data stores that meet policy requirements and, when coupled with the Virtual Volumes framework, dynamically instantiates the necessary data services. Through policy enforcement, storage policy-based management also automates service-level monitoring and compliance throughout the lifecycle of a virtual machine.

BRIEF DESCRIPTION OF THE DRAWINGS

FIG. 2 is a block diagram of example tables for data protection compliance between virtual machines' storage policies and backup policies, under an embodiment;

DETAILED DESCRIPTION

Figure 1:
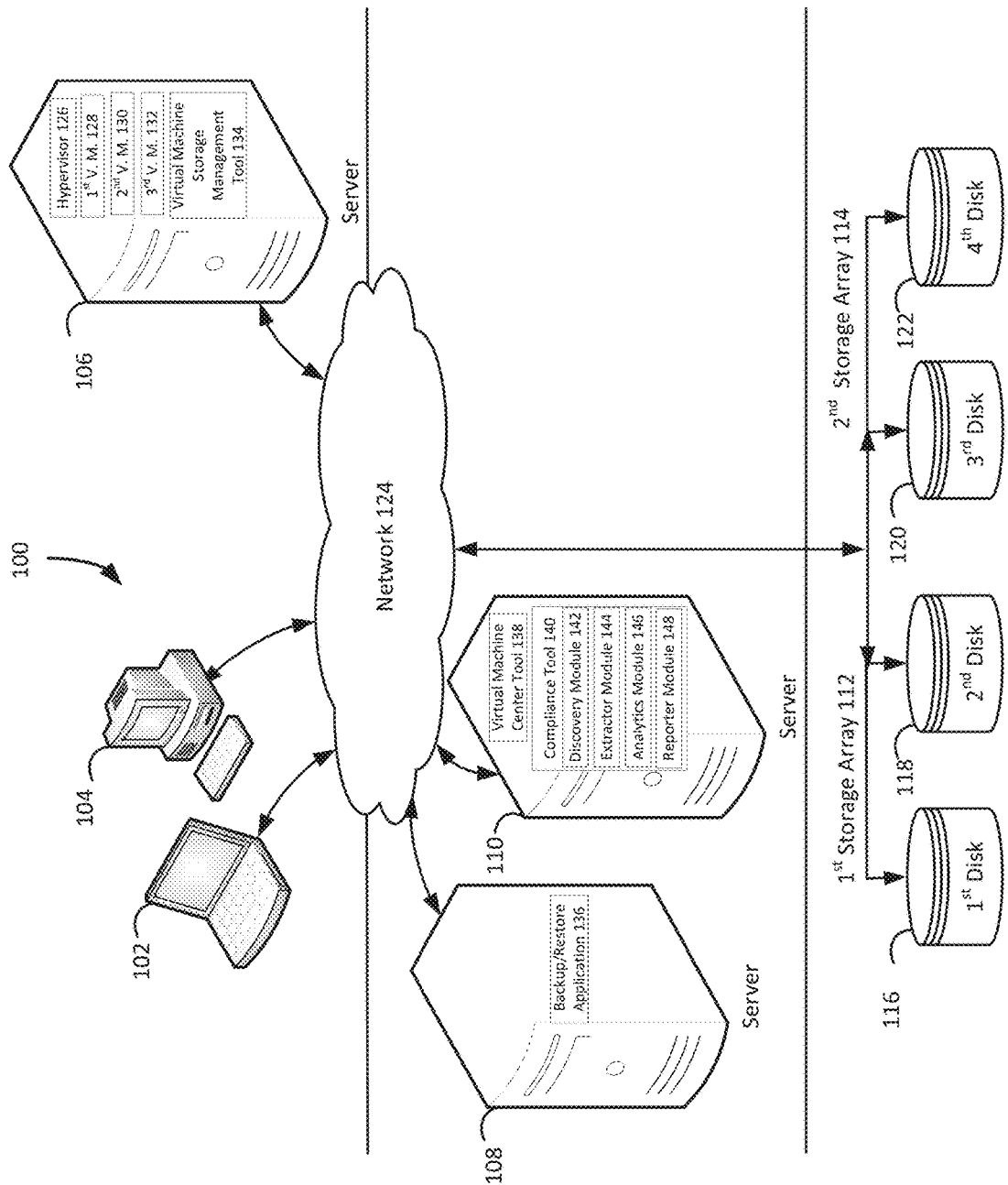
FIG. 1 illustrates a block diagram of an example system for data protection compliance between virtual machines' storage policies and backup policies, under an embodiment.

The following example uses the Virtual Volumes framework as the software-defined storage model where virtual machine workloads are running, but the same concept can be extended to any similar storage model that exists. In the case of brownfield deployment, an enterprise's information technology administrator should be able to seamlessly migrate the enterprise's existing virtual machines running on non-Virtual Volumes storage to new Virtual Volumes enabled storage while maintaining the same data protection requirements for the virtual machine workloads. The enterprise's backup administrator would have implemented a set of backup policies, which can differ significantly from the set of policies defined for the Virtual Volumes-enabled storage. Therefore, the information technology administrator needs to understand what has already been configured at the backup application side for the enterprise's existing virtual machines and how to seamlessly migrate from the legacy data protection application to the Virtual Volumes-enabled data protection.

For example, an enterprise uses a storage area network or network-attached storage to satisfy the enterprise's existing virtual machine storage needs, and uses traditional backup protection for these virtual machines by implementing backup policies based on schedule, retention, cloning, replication, etc. for the virtual machines in a backup application. The enterprise determines that the enterprise's storage vendor supports the Virtual Volumes framework, decides to implement the Virtual Volumes framework, and then the enterprise's storage administrator creates the desired capability profiles in a storage array. The enterprise's virtual machine administrator creates the required virtual machine storage policies via a virtual machine center tool so that the underlying vendor-specific capabilities of the storage array get exposed through the VASA virtual machine storage management tool to the enterprise's virtual machine administrator, and assigns the desired storage policies to a virtual machine, which enables the virtual machine to seamlessly consume the published capabilities. Then the compliant storage becomes available for the virtual machine administrator during provisioning virtual machines to the Virtual Volumes framework, thereby providing the virtual machine administrator with better manageability of the underlying storage resources for any virtual machines running on the Virtual Volumes framework.

However, since the enterprise has been running traditional backup protection, the backup policy characteristics such as schedule, retention, and cloning are maintained inside the backup application. Since the backup application is in a separate silo and is not involved in the process of implementing the Virtual Volumes framework, the virtual machine administrator has no visibility into the data protection policies already implemented for the existing virtual machine environment. After migrating the enterprise's existing virtual machines from traditional VMFS/NFS volumes to the new Virtual Volumes framework, the underlying backup characteristics for each virtual machine are not exposed to the virtual machine administrator. This creates a challenge in terms of having to ensure that the backup requirements are met for the migrated virtual machines, leaving it to the information technology administrator to do the manual mapping and compliance check from a backup perspective. The information technology administrator has to manually check the implemented backup policies and compare them against the Virtual Volumes storage policies to see whether the backup service level agreements are being met.

The information technology administrator's lack of visibility of the regulatory compliance of backup requirements for virtual machine workloads migrated to the Virtual Volumes framework could lead to errors and a lower total customer experience. Furthermore, a backup administrator may have to manually check all backup policies associated with the migrated virtual machines, which can be confusing in an environment with a large number of virtual machines. Additionally, backup requirements mapping is a "Day 2 operation" which could lead to failure to meet backup service level agreements after migration is completed. Moreover, manual migration can lead to under-optimization of resources. Also, some of the virtual machines may end up being protected by the backup application as well as Virtual Volumes based protection, leading to unwanted duplication in terms of data protection.

Embodiments herein enable data protection compliance between virtual machines' storage policies and backup policies. A compliance tool identifies a storage policy associated with a virtual machine storage management tool and a virtual machine. The compliance tool identifies a backup policy associated with the virtual machine. If the compliance tool determines that the backup policy has a data protection capability that is missing from the storage policy, the compliance tool outputs a report which indicates that the backup policy has the data protection capability that is missing from the storage policy.

For example, a compliance tool identifies a storage policy assigned to virtual machine 3, with the underlying vendor-specific capabilities of the corresponding storage array exposed through the VASA virtual machine storage management tool, and the storage policy specifies the data protection capabilities of weekly snapshots that are retained for 4 weeks. The compliance tool identifies a backup policy which specifies the data protection capabilities of daily backups that are retained for 2 weeks for virtual machine 3. Even before the storage policy is responsible for protecting the data of virtual machine 3, the compliance tool outputs a report which indicates that the backup policy has the daily data protection capability that is missing from the storage policy, which has a weekly data protection capability.

FIG. 1 illustrates a diagram of a system for data protection compliance between virtual machines' storage policies and backup policies, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a first storage array 112, and a second storage array 114 that may be provided by a hosting company. Although FIG. 1 depicts the first client 102 as a laptop computer 102, the second client 104 as a personal computer 104, and the third client 106 as a server 106, each of the clients 102-106 may be any type of computer. The first storage array 112 includes a first disk 116 and a second disk 118, and the second storage array 114 includes a third disk 120 and a fourth disk 122. Although examples describe the first storage array 112 storing backups based on backup policies, and the second storage array 114 storing snapshots based on storage policies, one storage array may store both backups based on backup policies and snapshots based on storage policies. The clients 102-106, the servers 108-110, and the storage arrays 112-114 communicate via a network 124. Although FIG. 1 depicts the system 100 with three clients 102-106, two servers 108-110, two storage arrays 112-114, four disks 116-122, and one network 124, the system 100 may include any number of clients 102-106, any number of servers 108-110, any number of storage arrays 112-114, any number of disks 116-122, and any number of networks 124. The clients 102-106 and the servers 108-110 may each be substantially similar to the system 400 depicted in FIG. 4 and described below.

The third client 106 includes a hypervisor 126, which may be a Microsoft Hyper-V® hypervisor. The hypervisor 126 creates and monitors a first virtual machine 128, a second virtual machine 130, and a third virtual machine 132 in the third client 106. The third client 106 also includes a virtual machine storage management tool 134, such as the VASA virtual machine storage management tool 134 that is available from VMware®. Although FIG. 1 depicts the third client 106 as including the hypervisor 126, the first virtual machine 128, the second virtual machine 130, the third virtual machine 132, and the virtual machine storage management tool 132, any of the clients 102-106 or all of the clients 102-106 may include a hypervisor, any number of virtual machines, and a virtual machine storage management tool.

The server 108, which may be referred to as the backup server 108, includes a backup/restore application 136 that creates backup files of the data and the metadata of the clients 102-106, stores the backup files on the first disk 116 and/or the second disk 118, and executes a rollback based on the backup files. The backup/restore application 136 may provide centralized administration, such as scheduling, monitoring, and managing backup operations and backup files. The backup/restore application 136 can enable the storing of backup operation schedules, client policies, and client configurations. The backup/restore application 136 maintains a local database of all processes that execute on the backup server 108. The backup/restore application 136 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 136 residing completely on the backup server 108, the backup/restore application 136 may reside in any combination of partially on the backup server 108, partially on the clients 102-106, and/or partially elsewhere. Even though the following paragraphs describe EMC Corporation's Avamar® backup/restore application and EMC Corporation's NetWorker® backup/restore application as examples of the backup/restore application 136, the backup/restore application 136 may be any other backup/restore application which provides the backup/restore functionalities described in the Background section.

The backup/restore application 136 may be an EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 136 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 110, which may be referred to as the virtual machine center server 110, includes and executes a virtual machine center tool 138 to provide a centralized and extensible platform for managing virtual infrastructure. This managing of virtual machine environments enables administrators to have simple and automated control over a virtual environment to deliver infrastructure. The virtual machine center server 110 provides centralized management of virtualized hosts and virtual machines from a single console, and gives administrators visibility into the configuration of all the critical components of a virtual infrastructure, all from one place. With the virtual machine center server 110, virtual environments are easier to manage, as a single administrator can manage hundreds of workloads, more than doubling typical productivity in managing physical infrastructure.

The virtual machine center server 110 also includes a compliance tool 140 that enables data protection compliance between virtual machines' storage policies and backup policies. The compliance tool 140 may include a discovery module 142, an extractor module 144, an analytics module 146, and a reporter module 148. While FIG.1 depicts the compliance tool 140 as including the modules 142-148, each of the modules 142-148 may be divided into smaller modules and/or combined together with other modules. Although FIG. 1 depicts the compliance tool 140 residing completely on the virtual machine center server 110, the compliance tool 140 may reside in any combination of partially on the virtual machine center server 110, partially on the clients 102-106, and/or partially elsewhere. Similarly, although FIG. 1 depicts the modules 142-148 residing completely on the virtual machine center server 110, any combination of any part of the modules 142-148 may reside in any combination of partially on the virtual machine center server 110, partially on the clients 102-106, and/or partially elsewhere.

After an enterprise's storage administrator creates the desired capability profiles in the $2^{nd}$ storage array 114, the enterprise's virtual machine administrator creates the required virtual machine storage policies via the virtual machine center tool 138 so that the underlying vendor-specific capabilities of the $2^{nd}$ storage array 114 get exposed through the VASA virtual machine storage management tool 134 to the enterprise's virtual machine administrator, who assigns the desired storage policies to virtual machines, which enables the virtual machines to seamlessly consume the published capabilities. The compliance tool 140 identifies the enterprise's currently defined storage policies associated with a virtual machine storage management tool and a set (one or more) of the enterprise's virtual machines. For example, the discovery module 142 accesses the storage policy based management's web services interface executing on the virtual machine center server 110 to identify all or user-specified storage policies, including a bronze storage policy that was assigned to the $3^{rd}$ virtual machine 130, with the underlying vendor-specific capabilities of the $2^{nd}$ storage array 114 exposed through the VASA virtual machine storage management tool 134. For this example, the bronze storage policy specifies the data protection capabilities of weekly snapshots that are retained for 4 weeks. A simplified example of an enterprise's storage policies is depicted in FIG. 2 and described below in reference to FIG. 2. Then the discovery module 142 can store the discovered storage policies in a storage policy database. The discovery module 142 can discover storage policies in response to a user request and/or in response to a recurring request based on a time period, such as an hour.

Having identified and stored currently defined storage policies, the compliance tool 140 can map a data protection capability for a storage policy to an equivalent data protection capability for any backup policy, as necessary. For example, the discovery module 142 maps the bronze storage policy's data protection capability of weekly snapshots to a backup policy's data protection capability of weekly backups. A simplified example of an enterprise's data storage capability mapping is depicted in FIG. 2 and described below in reference to FIG. 2. The discovery module 142 can enable users to create rules for mapping from a storage vendor-specific capability to an equivalent backup application parameter. If a storage vendor-specific capability already matches a backup application parameter, mapping may not be necessary for the storage vendor-specific capability. For example, the bronze storage policy's data storage capability of 4 week retention is already expressed in the same form as a backup storage capability of 4 week retention.

After identifying the storage policies for a set of virtual machines, the compliance tool 140 identifies any backup policies for the same set of virtual machines. For example, the extractor module 144 queries the backup policy database, and extracts the currently defined backup policies for the enterprise's virtual machines, including a backup policy that specifies the data protection capabilities of daily backups that are retained for 2 weeks for the $3^{rd}$ virtual machine 130. A simplified example of an enterprise's backup policies is depicted in FIG. 2 and described below in reference to FIG. 2. The input to the query may be filtered based on a variety of parameters, such as all clients having the string XYZ in the client name.

Having identified both storage policies and backup polices for a set of virtual machines, the compliance tool 140 determines whether any backup policy for a virtual machine has a data protection capability that is missing from the storage policy for the same virtual machine. For example, the analytics module 146 determines whether the backup policy for the $3^{rd}$ virtual machine 130, which specifies the data protection capabilities of daily backups that are retained for 2 weeks, has a data protection capability that is missing from the bronze storage policy for the $3^{rd}$ virtual machine 130, which specifies the data protection capabilities of weekly snapshots that are retained for 4 weeks. The analytics module 146 can store the results of the compliance comparisons in an analytics database. This compliance check can determine whether a set of backup policies for a set of virtual machines may be replaced by the corresponding storage policies for the set of virtual machines, and which storage policies are equivalent to the existing backup policies.

If the compliance tool 140 determines that the backup policy for a set of virtual machines has a data protection capability that is missing from the storage policy for the set of virtual machines, the compliance tool 140 outputs a report which indicates that the backup policy for the set of virtual machines has the data protection capability that is missing from the storage policy for the set of virtual machines. For example, the reporter module 148 fetches compliance comparison data from the analytics database, and outputs a report which indicates that the backup policy for the $3^{rd}$ virtual machine 130 has the daily data protection capability that is missing from the bronze storage policy the $3^{rd}$ virtual machine 130, which has a weekly data protection capability, even before the bronze storage policy is responsible for protecting the data of the $3^{rd}$ virtual machine 130. Although this example describes the compliance check and the compliance reporting as occurring before the migration of virtual machines to storage policy-based data protection, the compliance check and the compliance reporting may also or alternatively occur after the migration of virtual machines to storage policy-based data protection. System users can filter such compliance reports based on various options, such as which virtual machines' storage policies are not compliant from the virtual machine's backup policies' perspective, and which virtual machines' storage policies are duplicates of the virtual machine's backup policies. An information technology administrator can review such a report and inform a storage administrator, who can expose the necessary requirements as additional capability profiles in the corresponding storage array.

Having determined that the backup policy for a set of virtual machines has a data protection capability that is missing from the storage policy for the set of virtual machines, the compliance tool 140 can identify a storage policy that has the missing data protection capability. For example, the analytics module 146 determines that a silver storage policy has the daily data protection capability that is missing from the bronze storage policy, which has a weekly data protection capability, and the reporter module 148 outputs a report which indicates that the silver storage policy has the daily data protection capability that is missing from the bronze storage policy. An information technology administrator can review such a report and inform a storage administrator, who can expose the necessary requirements as additional capability profiles in the corresponding storage array.

Alternatively, after determining that a backup policy has a data protection capability for a set of virtual machines that is missing from a storage policy for the set of virtual machines, the compliance tool 140 can modify the storage policy. For example, the analytics module 146 modifies the bronze storage policy for the $3^{rd}$ virtual machine 130, which has a weekly data protection capability, to the silver storage policy for the $3^{rd}$ virtual machine 130, which has the daily data protection capability that is missing from the bronze storage policy. The compliance tool 140 may output a recommendation to modify a storage policy, and then modify the storage policy if an approval of the recommendation is received from an administrator.

An information technology administrator may want to continue using the traditional backup protection for some of the virtual machines while excluding other virtual machines from the traditional backup protection. Therefore, after identifying both the storage policy and the backup policy for a set of virtual machines, the compliance tool 140 can also check for duplicative data protection by determining whether the backup policy has a data protection capability that is duplicated in the storage policy. For example, the analytics module 146 determines whether the backup policy for the $2^{nd}$ virtual machine 128, which specifies the data protection capabilities of weekly backups that are retained for 4 weeks, has a data protection capability that is duplicated in the storage policy for the $2^{nd}$ virtual machine 128, which specifies the data protection capabilities of weekly snapshots that are retained for 4 weeks. If the compliance tool 140 determines that the backup policy for a set of virtual machines has a data protection capability that is duplicated in the storage policy for the set of virtual machines, the compliance tool 140 outputs a report which indicates that the backup policy for the set of virtual machines has the data protection capability that is duplicated in the storage policy for the set of virtual machines. For example, the reporter module 148 outputs a report which indicates that the backup policy for the $2^{nd}$ virtual machine 128, which specifies the data protection capabilities of weekly backups that are retained for 4 weeks, has a data protection capability that is duplicated in the storage policy for the $2^{nd}$ virtual machine 128, which also specifies the data protection capabilities of weekly snapshots that are retained for 4 weeks, even before the storage policy is responsible for protecting the data of the $2^{nd}$ virtual machine 128.

Having determined that the backup policy for a set of virtual machines has a data protection capability that is duplicated in the storage policy for the set of virtual machines, the compliance tool 140 can output an option to delete a data storage capability from either the backup policy or the storage policy. For example, the reporter module 148 outputs an option to delete either the backup policy for the $2^{nd}$ virtual machine 128 or the storage policy for the $2^{nd}$ virtual machine 128 because these two policies provide the $2^{nd}$ virtual machine 128 with duplicate data protection capabilities. After outputting an option to delete a data storage capability, the compliance tool 140 can delete a data storage capability from a backup policy or a storage policy based on a reply to the outputted option. For example, the analytics module 146 responds to an information technology administrator's request by deleting the storage policy for the $2^{nd}$ virtual machine 128, because the backup policy for the $2^{nd}$ virtual machine 128 provides the $2^{nd}$ virtual machine 128 with the same data protection capabilities, as the information technology administrator wants to continue using the traditional backup protection for the $2^{nd}$ virtual machine 128. In another example, the analytics module 146 responds to an information technology administrator's request by deleting the backup policy for the $2^{nd}$ virtual machine 128, because the storage policy for the $2^{nd}$ virtual machine 128 provides the $2^{nd}$ virtual machine 128 with the same data protection capabilities, as the information technology administrator does not want to continue using the traditional backup protection for the $2^{nd}$ virtual machine 128.

FIG. 2 is a block diagram of example tables 202 and 214 for data protection compliance between virtual machines' storage policies and backup policies, under an embodiment. The table 202 is an example of an output from the discovery module 142, and includes a storage policy identifier column 204, a storage policy name column 206, a storage capability column 208, a capability mapping column 210, and a client name(s) column 212. The storage policy identifier column 204 and the storage policy name column 206 identify each storage policy by its unique identifier and its name. The storage capability column 208 identifies which data protection capabilities have been assigned to the storage policy identified in the corresponding row of the table 202. The capability mapping column 210 identifies the equivalent backup capability for the data protection capabilities that have been assigned to the storage policy identified in the corresponding row of the table 202. For example, "Hourly Backup" is the equivalent backup capability for the storage policy's data protection capability of "Hourly Snapshots." The client name(s) column 212 identifies which virtual machines have been assigned to the storage policy identified in the corresponding row of the table 202.

The table 214 is an example of an output from the extractor module 144, and includes a client identifier column 216, a client name column 218, a backup policy identifier column 220, and a backup capability column 222. The client identifier column 216 and the client name column 218 identify each virtual machine by its unique identifier and its name. The backup policy identifier column 220 and the backup capability column 222 identify the backup policy and the data protection capabilities that have been assigned to the virtual machine identified in the corresponding row of the table 214.

Figure 3:
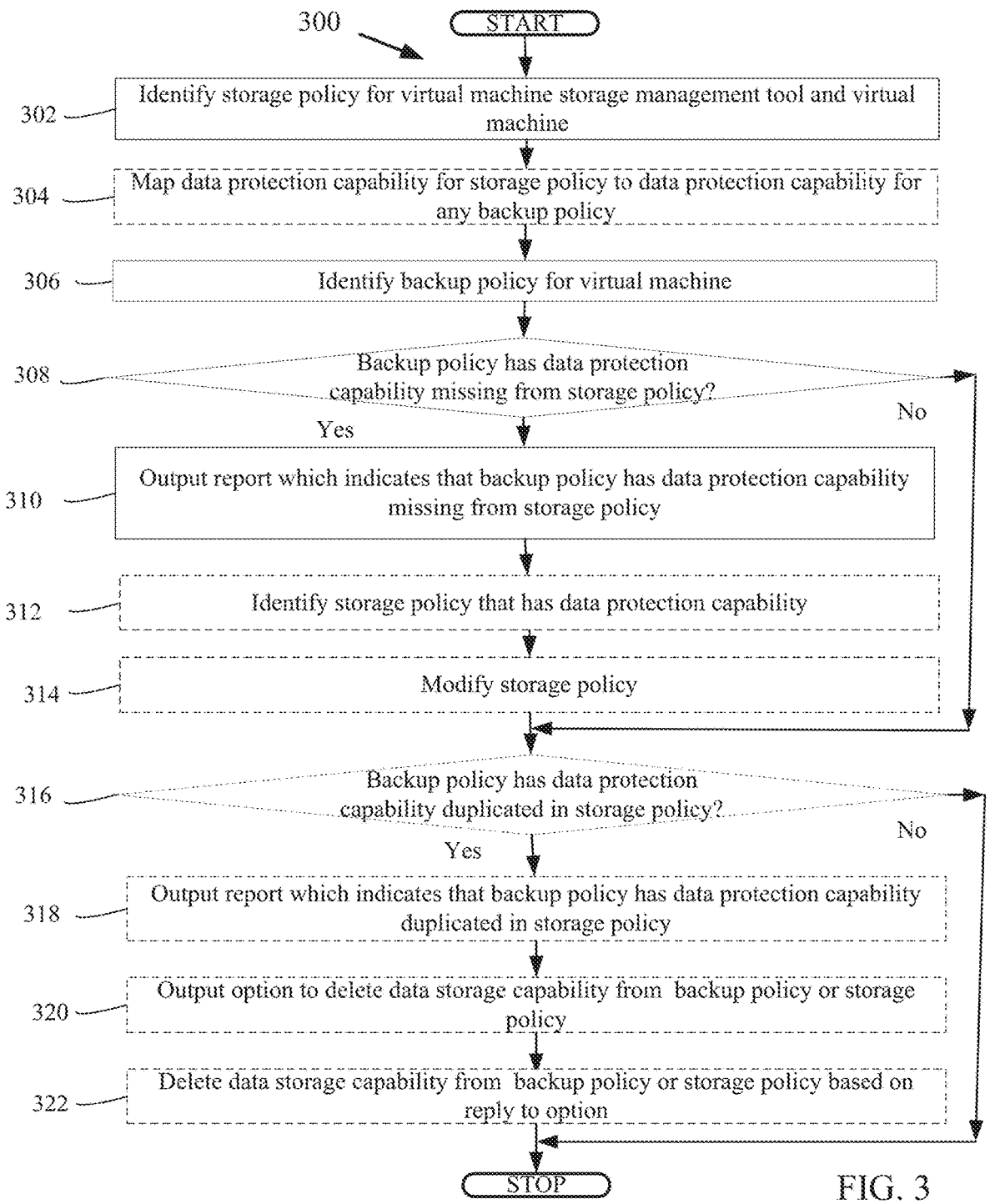
FIG. 3 is a flowchart that illustrates a method of data protection compliance between virtual machines' storage policies and backup policies, under an embodiment.

FIG. 3 is a flowchart that illustrates a method for data protection compliance between virtual machines' storage policies and backup policies, under an embodiment. Flowchart 300 illustrates method acts illustrated as flowchart blocks for certain steps involved in and/or between the clients 102-106 and/or the servers 108-110 of FIG. 1.

The system 100 identifies a storage policy associated with a virtual machine storage management tool and a virtual machine, block 302. For example, the compliance tool 140 identifies a bronze storage policy assigned to the $3^{rd}$ virtual machine 130, with the underlying vendor-specific capabilities of the $2^{nd}$ storage array 114 exposed through the VASA virtual machine storage management tool 134, and the bronze storage policy specifying the data protection capabilities of weekly snapshots that are retained for 4 weeks.

Having identified a storage policy, the system 100 optionally maps a data protection capability for the storage policy to a data protection capability for any backup policy, block 304. For example, the compliance tool 140 maps the bronze storage policy's data protection capability of weekly snapshots to a backup policy's data protection capability of weekly backups.

After identifying a storage policy associated with a virtual machine, the system 100 identifies a backup policy associated with the same virtual machine, block 306. For example, the compliance tool 140 identifies a backup policy that specifies the data protection capabilities of daily backups that are retained for 2 weeks for the $3^{rd}$ virtual machine 130.

Having identified both a storage policy and a backup policy for a virtual machine, the system 100 determines whether the backup policy has a data protection capability that is missing from the storage policy, block 308. For example, the compliance tool 140 determines whether the backup policy for the $3^{rd}$ virtual machine 130, which specifies the data protection capabilities of daily backups that are retained for 2 weeks, has a data protection capability that is missing from the bronze storage policy for the $3^{rd}$ virtual machine 130, which specifies the data protection capabilities of weekly snapshots that are retained for 4 weeks. If the backup policy has a data protection capability that is missing from the storage policy, the flowchart 300 continues to block 310 to report the missing data protection capability. If the backup policy does not have a data protection capability that is missing from the storage policy, the flowchart 300 proceeds to block 316 to check for duplicate data protection capabilities.

If the system 100 determines that a backup policy for a virtual machine has a data protection capability that is missing from storage policy for the virtual machine, the system 100 outputs a report which indicates that the backup policy has the data protection capability that is missing from the storage policy, block 310. For example, the compliance tool 140 outputs a report which indicates that the backup policy for the $3^{rd}$ virtual machine 130 has the daily data protection capability that is missing from the bronze storage policy the $3^{rd}$ virtual machine 130, which has a weekly data protection capability, even before the bronze storage policy is responsible for protecting the data of the $3^{rd}$ virtual machine 130.

Having determined that a backup policy for a virtual machine has a data protection capability that is missing from a storage policy for the virtual machine, the system 100 optionally identifies a storage policy that has the missing data protection capability, block 312. For example, the compliance tool 140 outputs a report which indicates that a silver storage policy has the daily data protection capability that is missing from the bronze storage policy, which has a weekly data protection capability.

After determining that a backup policy for a virtual machine has a data protection capability that is missing from a storage policy for the virtual machine, the system 100 optionally modifies the storage policy, block 314. For example, the compliance tool 140 modifies the bronze storage policy for the $3^{rd}$ virtual machine 130, which has a weekly data protection capability, to the silver storage policy for the $3^{rd}$ virtual machine 130, which has the daily data protection capability that is missing from the bronze storage policy.

Having identified both a storage policy and a backup policy for a virtual machine, the system 100 determines whether the backup policy has a data protection capability that is duplicated in the storage policy, block 316. For example, the compliance tool 140 determines whether the backup policy for the $2^{nd}$ virtual machine 128, which specifies the data protection capabilities of weekly backups that are retained for 4 weeks, has a data protection capability that is duplicated in the storage policy for the $2^{nd}$ virtual machine 128, which specifies the data protection capabilities of weekly snapshots that are retained for 4 weeks. If the backup policy has a data protection capability that is duplicated in the storage policy, the flowchart 300 continues to block 318 to report the duplicate data protection capability. If the backup policy does not have a data protection capability that is duplicated in the storage policy, the flowchart 300 terminates.

If the system 100 determines that the backup policy for a virtual machine has a data protection capability that is duplicated in the storage policy for the virtual machine, the system 100 outputs a report which indicates that the backup policy has the data protection capability that is duplicated in the storage policy, block 318. For example, the compliance tool 140 outputs a report which indicates that the backup policy for the $2^{nd}$ virtual machine 128, which specifies the data protection capabilities of weekly backups that are retained for 4 weeks, has a data protection capability that is duplicated in the storage policy for the $2^{nd}$ virtual machine 128, which also specifies the data protection capabilities of weekly snapshots that are retained for 4 weeks, even before the storage policy is responsible for protecting the data of the $2^{nd}$ virtual machine 128.

Having determined that the backup policy for a virtual machine has a data protection capability that is duplicated in the storage policy for the virtual machine, the system 100 optionally outputs an option to delete a data storage capability from the backup policy or the storage policy, block 320. For example, the compliance tool 140 outputs an option to delete either the backup policy for the $2^{nd}$ virtual machine 128 or the storage policy for the $2^{nd}$ virtual machine 128 because these two policies provide the $2^{nd}$ virtual machine 128 with duplicate data protection capabilities.

After outputting an option to delete a data storage capability, the system 100 optionally deletes a data storage capability from a backup policy or a storage policy based on a reply to the option, block 322. For example, the compliance tool 140 responds to an administrator's request by deleting the storage policy for the $2^{nd}$ virtual machine 128, because the backup policy for the $2^{nd}$ virtual machine 128 provides the $2^{nd}$ virtual machine 128 with the same data protection capabilities.

Although FIG. 3 depicts the blocks 302-322 occurring in a specific order, the blocks 302-322 may occur in another order. In other implementations, each of the blocks 302-322 may also be executed in combination with other blocks and/or some blocks may be divided into a different set of blocks.

Figure 4:
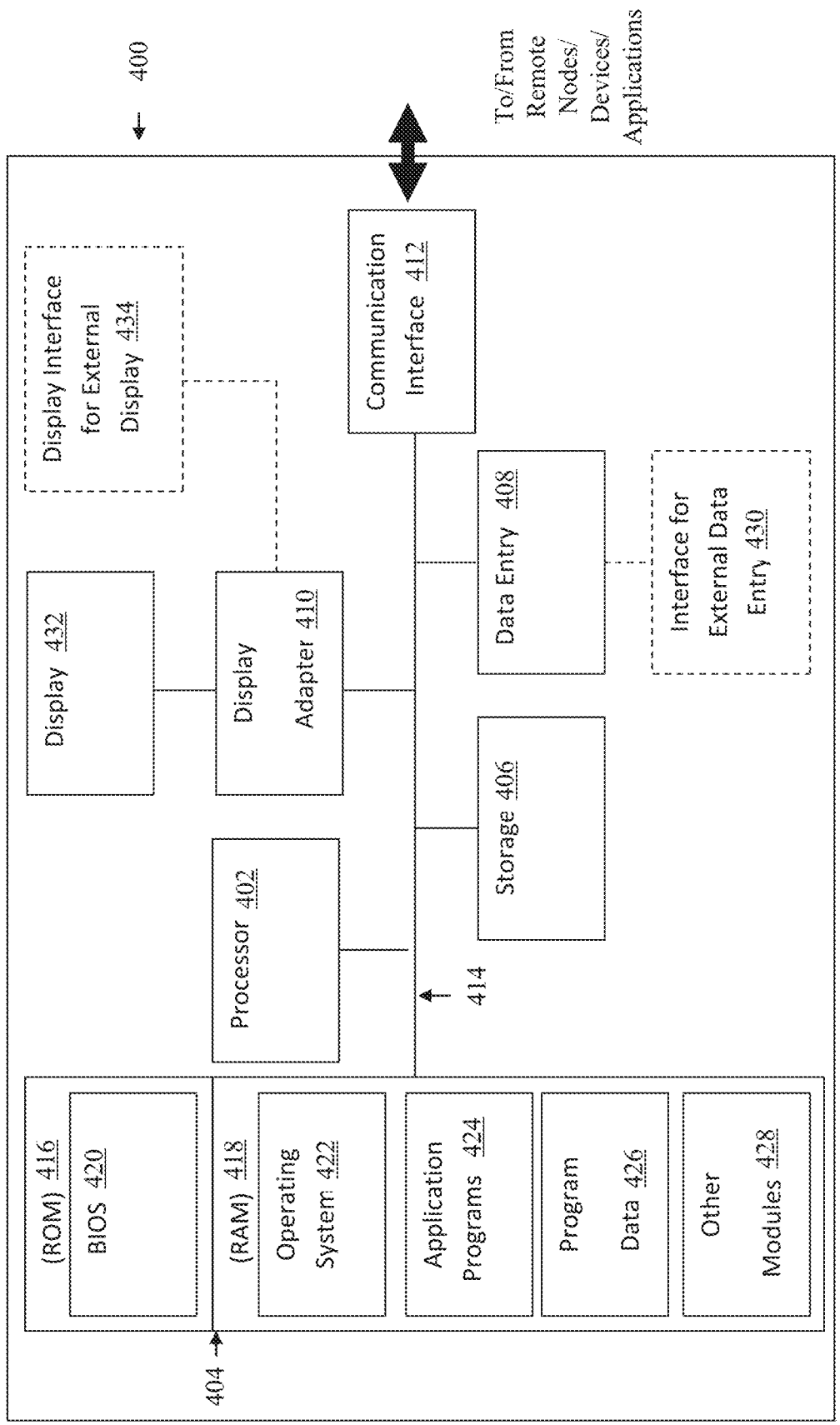
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for data protection compliance between a storage policy and a backup policy associated with a virtual machine, the system comprising:
   one or more processors; and
   a non-transitory computer readable medium storing a plurality of instructions, which when executed, will cause the one or more processors to:
   identify a storage policy associated with a virtual machine, currently running according to a first type of storage framework, and a virtual machine storage management tool of a different second type of storage framework;
   identify an existing backup policy for the virtual machine, the backup policy providing data protection for the virtual machine;
   determine whether the existing backup policy comprises a data protection capability missing from the storage policy;
   select a different storage policy that includes the data protection capability missing from the storage policy; and
   initiate availability of the different storage policy for the virtual machine to the virtual machine storage management tool during provisioning of the virtual machine from the first type of storage framework to the different second type of storage framework.

2. The system of claim 1, wherein the processor-based application further causes the processor to map a data protection capability associated with the storage policy to a data protection capability associated with any backup policy.

3. The system of claim 1, wherein the data protection capability is associated with at least one of an initiation frequency and an instance retention period.

4. The system of claim 1, wherein the processor-based application further causes the processor to identify a storage policy that comprises the data protection capability in response to the determination that the backup policy comprises the data protection capability missing from the storage policy.

5. The system of claim 1, wherein the processor-based application further causes the processor to cause a report to be outputted indicating that the backup policy comprises the data protection capability missing from the storage policy in response to a determination that the backup policy comprises the data protection capability missing from the storage policy.

6. The system of claim 1, wherein the processor-based application further causes the processor to:
   determine whether the backup policy comprises a data protection capability duplicated in the storage policy; and
   cause a report to be outputted, in response to a determination that the backup policy comprises the data protection capability duplicated in the storage policy, the report indicating that the backup policy comprises the data protection capability duplicated in the storage policy.

7. The system of claim 6, wherein the processor-based application further causes the processor to:
   output an option to delete the data storage capability from one of the backup policy and the storage policy in response to a determination that the backup policy comprises the data protection capability duplicated in the storage policy; and
   delete the data storage capability from one of the backup policy and the storage policy based on a reply to the option.

8. The system of claim 1, wherein the existing backup policy is executed by a backup application that is inaccessible to the virtual machine storage management tool of the different second type of storage framework.

9. The system of claim 8, wherein the first type of storage framework comprises a non-Virtual Volumes framework and the different second type of storage framework comprises a Virtual Volumes framework.

10. A computer-implemented method for data protection compliance between a storage policy and a backup policy associated with a virtual machine, the method comprising:
    identifying a storage policy associated with a virtual machine, currently running according to a first type of storage framework, and a virtual machine storage management tool of a different second type of storage framework;
    identifying an existing backup policy for the virtual machine, the backup policy providing data protection for the virtual machine;
    determining whether the existing backup policy, comprises a data protection capability missing from the storage policy;
    selecting a different storage policy that includes the data protection capability missing from the storage policy; and initiating availability of the different storage policy for the virtual machine to the virtual machine storage management tool during provisioning of the virtual machine from the first type of storage framework to the different second type of storage framework.

11. The method of claim 10, wherein the method further comprises mapping a data protection capability associated with the storage policy to a data protection capability associated with any backup policy; and
wherein the data protection capability is associated with at least one of an initiation frequency and an instance retention period.

12. The method of claim 10, wherein the method further comprises identifying a storage policy that comprises the data protection capability in response to the determination that the backup policy comprises the data protection capability missing from the storage policy.

13. The method of claim 10, wherein the method further comprises causing a report to be outputted indicating that the backup policy comprises the data protection capability missing from the storage policy in response to a determination that the backup policy comprises the data protection capability missing from the storage policy.

14. The method of claim 10, wherein the method further comprises:
determining whether the backup policy comprises a data protection capability duplicated in the storage policy; and
causing a report to be outputted, in response to a determination that the backup policy comprises the data protection capability duplicated in the storage policy, the report indicating that the backup policy comprises the data protection capability duplicated in the storage policy;
outputting an option to delete the data storage capability from one of the backup policy and the storage policy in response to a determination that the backup policy comprises the data protection capability duplicated in the storage policy; and
deleting the data storage capability from one of the backup policy and the storage policy based on a reply to the option.

15. A computer program product, comprising a non-transitory computer-readable medium having a computer-readable program code embodied therein to be executed by one or more processors, the program code including instructions to:
identify a storage policy associated with a virtual machine, currently running according to a first type of storage framework, and a virtual machine storage management tool of a different second type of storage framework;
identify an existing backup policy for the virtual machine, the backup policy providing data protection for the virtual machine;
determine whether the existing backup policy comprises a data protection capability missing from the storage policy;
select a different storage policy that includes the data protection capability missing from the storage policy; and
initiate availability of the different storage policy for the virtual machine to the virtual machine storage management tool during provisioning of the virtual machine from the first type of storage framework to the different second type of storage framework.

16. The computer program product of claim 15, wherein the program code includes further instructions to map a data protection capability associated with the storage policy to a data protection capability associated with any backup policy.

17. The computer program product of claim 15, wherein the data protection capability is associated with at least one of an initiation frequency and an instance retention period.

18. The computer program product of claim 15, wherein the program code includes further instructions to identify a storage policy that comprises the data protection capability in response to the determination that the backup policy comprises the data protection capability missing from the storage policy.

19. The computer program product of claim 15, wherein the program code includes further instructions to cause a report to be outputted indicating that the backup policy comprises the data protection capability missing from the storage policy in response to a determination that the backup policy comprises the data protection capability missing from the storage policy.

20. The computer program product of claim 15, wherein the program code includes further instructions to:
determine whether the backup policy comprises a data protection capability duplicated in the storage policy;
cause a report to be outputted, in response to a determination that the backup policy comprises the data protection capability duplicated in the storage policy, the report indicating that the backup policy comprises the data protection capability duplicated in the storage policy;
output an option to delete the data storage capability from one of the backup policy and the storage policy in response to a determination that the backup policy comprises the data protection capability duplicated in the storage policy; and
delete the data storage capability from one of the backup policy and the storage policy based on a reply to the option.

* * * * *